May 7, 1968
R. G. BOWMAN
3,381,975
CHILD'S HAND-PROPELLED VEHICLE
Filed Feb. 18, 1966
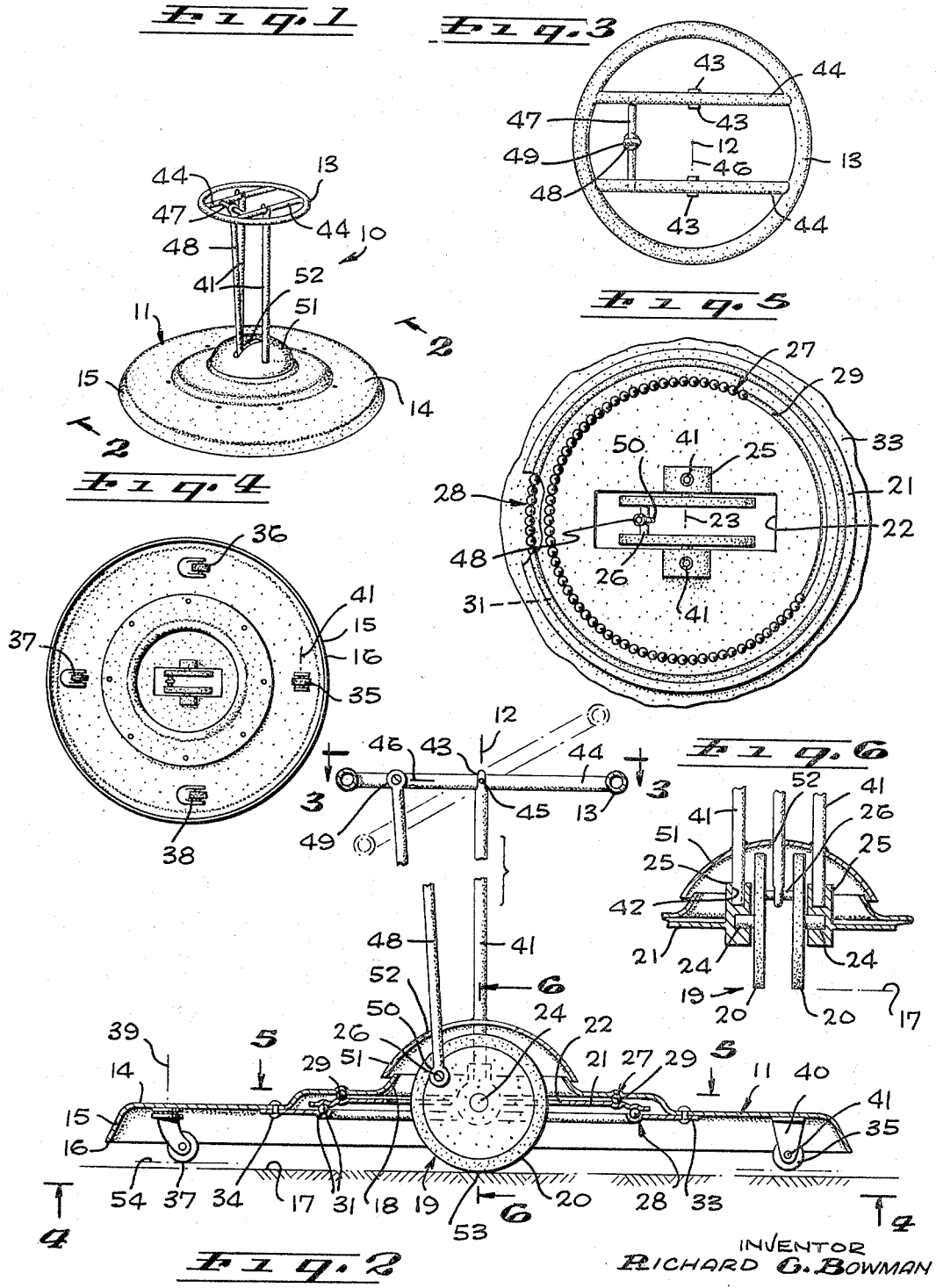
INVENTOR
RICHARD G. BOWMAN
BY William P. Green
ATTORNEY United States Patent Office 3,381,975
Patented May 7, 1968

3,381,975
CHILD'S HAND-PROPELLED VEHICLE
Richard G. Bowman, 7652 Bella Vista St.,
Los Angeles, Calif. 90045
Filed Feb. 18, 1966, Ser. No. 528,441
1 Claim. (Cl. 280—240)

ABSTRACT OF THE DISCLOSURE

A toy vehicle having a platform on which a rider may stand, a pair of wheels at essentially the center of the platform, a steering unit above the platform for turning the mentioned wheels relative to the platform to steer the vehicle, mechanism for driving the wheels in response to up and down pumping motion of the steering unit, to thereby drive the vehicle, and additional wheels at the underside of the platform for engaging the ground at locations about the previously mentioned wheels.

---

This invention relates to an improved type of vehicle, for transporting persons from place to place, and which may typically be utilized as a toy by children.

A major object of the present invention is to provide a vehicle which is capable of affording to an individual a unique and novel type of ride which is completely different from the rides attained by prior toy vehicles and the like. Preferably contemplated is a vehicle which is very easily maneuverable over a road or ground surface, and can be turned on a very short radius enabling the device to be ridden in confined areas where most toys cannot practically be driven. At the same time, a toy constructed in accordance with the invention may be designed to be ridden in any of two or more different ways, in one of which the vehicle is purposely less easily controllable than in the other, to provide a new type of ride sensation.

An additional object of the invention is to provide a vehicle in which a single steering wheel or other steering unit serves the dual purposes of both steering and powering the vehicle. More particularly, the steering unit is mounted for movement in two different directions, with movement in one of these directions serving to steer the guiding wheels of the vehicle, while movement in the other direction or manner acts through a mechanical drive system to power one or more of the wheels of the vehicle in a manner causing it to advance along a ground surface. Preferably, the steering motion is a conventional type of turning of the steering unit or wheel about a preferably vertical axis, while the second type of motion of the unit is an up and down pumping motion of the steering wheel or unit for driving a ground engaging wheel of the vehicle.

Another object of the invention is to provide a vehicle which may transport several persons at the same time, and which desirably gives the appearance of a flying saucer, having a generally circular platform on which the different riders may stand at different positions about the central axis of the device.

Structurally, a vehicle embodying the invention may include a main wheel assembly positioned to engage a supporting ground surface, and mounted to turn about a generally vertical axis to steer the vehicle. In combination with this first mentioned wheel structure or assembly, I provide a plurality of additional or auxiliary ground engaging wheels, which are spaced circularly about the steerable main wheel of the device, to support the vehicle at different locations about that main wheel (or plurality of wheels). More particularly, the mentioned additional wheels may be carried by a main body of the device, with the steerable wheel being mounted by an appropriate bearing structure to turn relative to the body, and desirably having the dual action steering and powering unit previously discussed.

The above and other features and objects of the invention will be better understood from the following detailed description of the typical embodiment illustrated in the accompanying drawing in which:

FIG. 1 is a perspective representation of a toy vehicle constructed in accordance with the invention;

FIG. 2 is an enlarged fragmentary vertical section taken on line 2—2 of FIG. 1;

FIG. 3 is a plan view of the steering wheel or unit of the device, taken on line 3—3 of FIG. 2;

FIG. 4 is a reduced bottom view of the vehicle, taken on line 4—4 of FIG. 2;

FIG. 5 is a fragmentary horizontal section taken on line 5—5 of FIG. 2; and

FIG. 6 is a fragmentary vertical section taken on line 6—6 of FIG. 2.

Referring first to FIG. 1, I have illustrated at 10 a "flying saucer" toy vehicle constructed in accordance with the invention, and having a main body 11 forming a platform on the upper surface of which one or more children may stand at different locations about the vertical axis 12 of the vehicle. The device is steered and powered by movements of a steering wheel 13 which is elevated above the level of body 11, and is centered about axis 12.

Body 11 may be circular and formed of sheet metal of appropriate strength to support the riders. This sheet metal of body 11 may form an annular horizontally extending portion 14 of body 11, centered about and perpendicular to vertical axis 12, and curved downwardly at its periphery to form an annular depending flange or skirt 15. This skirt 15 may have a circular bottom edge 16 received in proximity to but spaced above the road or ground surface 17 on which the vehicle is driven. At its center, body 11 has a circular opening 18 centered about axis 12, and within which there is movably mounted a wheel structure or wheel assembly 19 consisting of two interconnected identical parallel spaced wheels 20 which engage and roll along ground surface 17. Wheels 20 are rotatably mounted to a horizontal carriage or plate 21, which is in turn mounted for bodily steering rotation with wheels 20 about vertical axis 12, relative to body 11. Wheels 20 are received within an appropriately shaped opening 22 (FIGS. 2, 5 and 6) in plate 21, to turn about a common horizontal axis 23 relative to plate 21. To mount the wheels for this rotary motion, there are provided in the wheels appropriate bearings or bushings disposed about and carried by two aligned horizontally extending non-rotating stub shafts 24, which may be rigidly carried by and project from two enlarged portions 25 of plate 21. The two wheels are rigidly interconnected for rotation in unison by an eccentric cross piece or crank member 26, which extends between the two wheels at a location parallel to but offset from axis 23, and is rigidly connected at its opposite ends to these wheels respectively.

Plate 21 and the wheels 20 are mounted for their steering movement about axis 12 by means of two circular series of ball bearings 27 and 28. Balls 27 are received within opposed annular grooves 29 formed in plate 21 and body 11, and both centered about axis 12, while balls 28 are similarly received within annular grooves 31 formed in plate 21 and an annular plate 33, which is suitably secured by circularly spaced rivets or other fasteners 34 to body 11. As will be apparent, balls 27 prevent upward movement of plate 21 and wheels 20 relative to body 11, while balls 28 prevent downward movement of plate 21 and the wheels, all in a manner allowing low friction rotation of plate 21 and the wheels about axis 12 relative to body 11.

At a series of circularly spaced locations about axis 12, and about wheels 20, body 11 carries a plurality of additional wheels 35, 36, 37 and 38 (FIGS. 2 and 4). These wheels are preferably spaced outwardly a substantial distance beyond plate 21, and desirably near the peripheral skirt 15 of body 11, to support that body and the riders of the vehicle at locations offset from wheels 20 and vertical axis 12. Preferably, there are at least three of these wheels 35, etc., with each of the wheels being positioned closer than 180 circular degrees to the two adjacent wheels, circularly about axis 12. That is, wheel 35 should not be as much as 180 degrees from either of the adjacent wheels 36 or 38, and desirably is much closer than 180 degrees. For best results, there are at least four of the wheels 35, 36, etc. with these wheels being uniformly circularly spaced about axis 12, and preferably each being not more than about 90 circular degrees from the two adjacent wheels, to in this way assure a highly effective support of the platform body 11, without any danger of undue tilting or loss of control.

It is found desirable that most of the peripheral wheels be caster type wheels (see caster 37 of FIG. 2), adapted to swing freely about individual vertical axes 39 so that the platform may turn freely under the control of the operator. For best operation, all the peripheral wheels but one are such casters (this being true of the three wheels 36, 37 and 38 in FIG. 4), while the other wheel (35) is not a caster, and is not capable of swivelling or turning about an individual vertical axis, but rather is mounted by its bearing support bracket 40 to turn only about a single horizontal axis 41 which is permanently fixed relative to body 11. Thus, wheel 35 is constrained to roll only in a leftward or rightward direction as viewed in FIG. 2, and cannot swivel to advance transversely of that direction.

To mount steering wheel 13 in the FIG. 1 position, plate 21 carries two upstanding parallel rigid frame or support rods 41, whose lower ends may be rigidly connected to plate 21 in any appropriate manner, as by rigid connection into two socket recesses 42 formed in enlargements 25 above stub shafts 24. At their upper ends, shafts 41 may be bifurcated to each form two spaced bracket arms 43 (FIG. 3). Steering wheel 13 may rigidly carry two parallel cross pieces 44, each received between the two arms 43 of one of the support rods 41, and pivotally connected to arms 43 by a pivot pin 45 in a manner mounting steering wheel 13 for oscillating swinging movement about a horizontal axis 46 relative to support rods 41. A crank element 47 extends between cross pieces 44, and parallel to axis 46, and is rigidly connected to elements 44. A connecting rod 48 for driving wheels 20 has a bearing loop 49 at its upper end disposed about crank element 47 of the steering wheel, and has a similar bearing loop 50 at its lower end extending about crank element 26 of wheel assembly 19, in a relation such that upward and downward pumping action of one side of steering wheel 13, about axis 46 (see broken line position of FIG. 2) will act to continuously rotate wheels 20 in unison about axis 23.

The upper side of wheels 20 may be enclosed by an annular cover element 51, appropriately welded or otherwise rigidly secured to vertical support elements 41, to turn therewith about axis 12. Cover 51 of course contains an aperture or slot 52 of a size and shape to receive vertical connecting rod 48 in its various drive positions.

As seen best in FIG. 2 it is preferred that the lowermost ground engaging portions 53 of wheels 20 project downwardly slightly beneath the plane 54 which just contacts the undersurfaces of the peripheral wheels 35, 36, 37 and 38, so that wheels 20 may always be assured of contacting the road surface 17, and also so that a rider may cause one or more of the peripheral wheels to raise off of the ground surface when desired.

To now describe the manner of use of the vehicle, it is contemplated that a rider will normally stand on body 11 at a location approximately above the non-swivelling wheel 35. While standing in this position, he pumps steering wheel 13 upwardly and downwardly about axis 46, in a manner acting to mechanically and positively drive wheels 20 and thereby advance the vehicle leftwardly as viewed in FIG. 2. When he reaches a corner, he may turn the vehicle by turning steering wheel 13 about vertical axis 12, so that the steering wheel acts through support rods 41 to turn plate 21 and the carried wheels 20 about axis 12, to steer the vehicle in a new direction. Thus, the rider can both steer and propel the vehicle by manipulation of a single steering wheel or unit 13. Swivelling wheels 36, 37 and 38 will of course swivel about their individual axes 39 to follow any movement of wheels 20.

If desired, the rider may stand on body 11 at a location offset from wheel 35, and typically at a point above one of the other wheels such as wheel 37, in which case wheel 35 will be slightly elevated off of road surface 17, and the free swivelling movement of all of the then contacting casters 36, 37 and 38 will result in a new type of ride sensation in which there is less control of the movement of body 11, and in which greater skill is therefore required for maneuvering the vehicle. In either condition, additional passengers may ride on the body 11 at different points about its circular extent, to add further to the novelty of the ride provided.

I claim:

1. A vehicle comprising a body structure adapted to support a rider, a first ground engaging wheel structure positioned and constructed to turn about a generally horizontal axis and to roll along a ground surface, means connecting said wheel structure to said body structure to turn relative thereto about a generally vertical axis in a relation steering the vehicle, a plurality of additional ground engaging wheels carried by said body structure at locations spaced about and at different sides of said first wheel structure and said generally vertical axis, a steering unit connected to said first ground engaging wheel structure in a relation to turn it about said generally vertical axis, means mounting said steering unit for up and down pumping movement, and connecting rod means connecting said steering unit to said first wheel structure to turn the latter about said generally horizontal axis upon said pumping movement of the steering unit to thereby advance the vehicle, said means connecting said wheel structure to said body structure including a bearing structure extending essentially about said generally vertical axis and disposed essentially about said first wheel structure, said body structure forming a platform extending generally circularly about said first wheel structure and carrying said additional wheels at its underside and on which a plurality of riders may be carried at different locations about said generally vertical axis, said additional wheels including at least two casters which are free to swivel about individual vertical axes relative to the body structure and another wheel which can not swivel, each of said additional wheels being within 180 degrees of two adjacent ones of said additional wheels circularly about said generally vertical axis, said additional wheels being receivable in positions in which a plane engaging their ground contacting undersurfaces is received slightly above the plane of the ground engaging undersurface of said first wheel structure.

References Cited

UNITED STATES PATENTS

| | | | |
|---|---|---|---|
| 206,020 | 7/1878 | Hollweg | 280—250 |
| 1,203,142 | 10/1916 | Semradek | 280—248 |
| 1,307,944 | 6/1919 | Watson | 180—52 |
| 1,719,197 | 7/1929 | Schlothan | 280—47.16 |
| 2,920,904 | 1/1960 | Doud et al. | 280—205 |
| 3,164,391 | 1/1965 | O'Neal | 280—1.12 |

KENNETH H. BETTS, *Primary Examiner.*